(12) United States Patent
Ozawa

(10) Patent No.: US 6,749,016 B2
(45) Date of Patent: *Jun. 15, 2004

(54) BRINE TEMPERATURE CONTROL APPARATUS USING A THREE-WAY PROPORTIONAL VALVE

(75) Inventor: Toru Ozawa, Irvine, CA (US)

(73) Assignee: SMC Kabushiki Kaisha, Tokyo (JP)

( * ) Notice: Subject to any disclaimer, the term of this patent is extended or adjusted under 35 U.S.C. 154(b) by 207 days.

This patent is subject to a terminal disclaimer.

(21) Appl. No.: 10/043,157

(22) Filed: Jan. 14, 2002

(65) Prior Publication Data

US 2003/0131984 A1 Jul. 17, 2003

(51) Int. Cl.[7] .............................................. F25D 23/00
(52) U.S. Cl. ........................ 165/264; 62/185; 219/494; 165/297
(58) Field of Search ................................ 165/263, 264, 165/297; 62/196.4, 185; 219/494

(56) References Cited

U.S. PATENT DOCUMENTS

| 2,466,769 A | * | 4/1949 | Herold et al. ............... 165/263 |
| 2,788,264 A | * | 4/1957 | Bremer et al. .......... 165/263 X |
| 3,262,492 A | * | 7/1966 | Meenan .................. 165/264 X |
| 4,042,011 A | * | 8/1977 | Schneider .................... 165/297 |
| 4,218,885 A | * | 8/1980 | White ..................... 165/297 X |
| 4,984,628 A | * | 1/1991 | Uchida et al. .......... 165/297 X |
| 6,003,595 A | * | 12/1999 | Watanabe ............... 165/264 X |
| 6,109,346 A | * | 8/2000 | Hill ............................ 165/297 |
| 6,397,943 B1 | * | 6/2002 | Egara .......................... 165/263 |
| 6,614,353 B2 | * | 9/2003 | Ozawa ................... 62/196.4 X |

FOREIGN PATENT DOCUMENTS

JP        5-17535        5/1993

* cited by examiner

*Primary Examiner*—L V Ciric
(74) *Attorney, Agent, or Firm*—Paul A. Guss

(57) ABSTRACT

In a brine temperature control apparatus, the temperature of brine in a tank disposed in a brine fluid circulating passage is controlled using a three-way proportional valve. The three-way proportional valve does not open and close in an abrupt ON/OFF fashion, but rather the degree of opening thereof for supplying chilled brine to the tank is gradually adjusted in proportion to a detection signal indicative of the brine temperature in the tank. Thus, a water hammer problem is avoided, and the coolant circulating circuit including such a three-way proportional valve can be used effectively even with large capacity chiller units.

3 Claims, 5 Drawing Sheets

PRIOR ART

Prior Art

Prior Art

BRINE TEMPERATURE CONTROL APPARATUS USING A THREE-WAY PROPORTIONAL VALVE

BACKGROUND OF THE INVENTION

1. Field of the Invention

The present invention relates to a brine temperature control apparatus, for controlling brine within a wide temperature range, and more specifically concerns a brine temperature control apparatus using a three-way proportional valve in the brine circulating fluid path.

2. Description of the Related Art

Formerly, when the temperature of brine which is supplied to a load is to be controlled inside a temperature range of −30° C. to +80° C., driving of a cooling unit (also referred to as a "chiller") is first halted and then applied heat is supplied to the brine from a heater.

FIG. 3 illustrates an example of a known type of brine temperature control apparatus, in which a cooling unit 1 is constructed by a compressor 4, a condenser 5, an expansion valve 6 and a heat exchanger 7 connected together successively in series. In the case that the temperature of the brine is controlled over a wider temperature range, the cooling unit may be made up of an array of plural units.

On the other hand, the circulating circuit 2 is constructed by a brine tank 11, a pump 12 and a load 13 connected successively in series, wherein the heat exchanger 7 and a heater 14 are disposed inside the tank 11. Driving and halting of the cooling unit 1, along with supply of electricity to the heater 14, are controlled by a temperature controller 16, which is operated in accordance with a temperature sensor which detects the brine temperature in the tank 11.

In this known type of temperature control apparatus, for example, when the temperature of the brine is controlled at +80° C., a control is performed in which only one cooling unit 1 is operated as a cooling source, and heat is also applied from the heater 14 to the brine in the tank 11, that has been cooled by the cooling unit 1.

Further, when the temperature of the brine is controlled at +30° C., a control is performed in which two cooling units 1, 1 are operated as the cooling source (such an arrangement of two cooling units is not actually shown in FIG. 3 although such a structure is easily understood), while heat is applied by the heater 14. When the brine temperature is to be controlled at −30° C., a control is performed in which multiple cooling units 1 are operated simultaneously. In all of these examples, after the brine has been cooled in excess of the received heat from the load 13, heat must be applied from the heater 14.

As described above, when controlling brine temperature according to this known type of temperature control apparatus, a plurality of cooling units 1 may be operated for controlling brine temperature, however, there is a limit to the precision of the temperature control by operating and halting of the cooling units 1. For raising precision, after cooling in excess of a predetermined temperature, it is necessary to apply heat using the heater 14, so there is a problem of a large wasting of energy.

In order to address such a problem, according to Japanese Utility Model Disclosure Document No. 5-17535, a temperature control apparatus has been proposed in which it is possible to control temperature over a wider temperature range with higher precision, and moreover, in which energy consumption is lower. Such an apparatus, as shown in FIG. 4, is characterized by a refrigeration circuit and cooling liquid circulating circuit, wherein the cooling liquid circulating passage further comprises an auxiliary coolant path 78 which branches from an outlet side of the pump 74, and then passes through an ON/OFF type of electromagnetic valve 79 and the heat-exchanger 61, providing fluid transport in a recirculating manner back to the tank 62. Further, the temperature controller 76 causes the ON/OFF type electromagnetic valve 79 to open when the temperature of the cooling liquid in the tank 72 is higher than a preset temperature, and causes electricity to be supplied to the heater 73 when the cooling liquid temperature falls below a preset temperature.

The basic operation of the this known type of apparatus may be described as follows, with reference to FIG. 5. When the temperature of the cooling liquid in the tank 72 is higher than, for example 0.4° C. above, a preset temperature, the ON/OFF electromagnetic valve 79 is opened by the temperature controller 76, so that the cooling liquid which flows through the auxiliary coolant flow path 78 is chilled by the heat exchanger and quickly recirculates back to the tank 72. In the case that the cooling liquid temperature becomes lower than the preset temperature set in the temperature controller 76, for example 0.1° C. below the preset temperature, the ON/OFF electromagnetic valve 79 is closed. In addition when the temperature falls about 0.4° C. below the preset temperature, heat is applied from the heater 73, until the temperature rises to about 0.35° C. below the preset temperature, at which point the heater 73 is turned off. Thus, by combined operations of the electromagnetic valve 79 and the heater 73, the temperature of the cooling liquid in the tank 72 can be maintained inside the preset temperature range of the temperature controller 76.

Because cooling of the cooling liquid in the auxiliary coolant path 78, as well as application of heat by the heater 73, is selectively performed by raising and lowering the cooling liquid temperature with respect to the preset temperature range, compared to the case of applying heat by a heater to a previously-cooled cooling liquid for controlling to a set temperature range, consumption of energy can be lessened overall, while notwithstanding, the temperature control is highly accurate. Further, by selectively cooling and applying heat to the cooling liquid, control over a wider temperature range is made possible.

However, the apparatus according to Japanese Utility Model Disclosure Document No. 5-17535 has experienced problems of its own. In particular, this apparatus uses an electromagnetic ON/OFF type valve 79 and a heater 73, making up an ON/OFF system, which enables temperature control over a wide range from about −20° C. to +90° C. However, because of use of the ON/OFF type of electromagnetic valve 79, during abrupt ON/OFF switching operations of the electromagnetic valve, an undesirable "water hammer" effect has been generated. The problem is all the more aggravated in the case of large capacity chiller units, resulting in a cumbersome and vexing disadvantage which has yet to be fully solved. Because of the water hammer effect, it has not been possible to implement this system in large capacity chiller units.

SUMMARY OF THE INVENTION

The present invention is a brine temperature control apparatus in which the temperature of brine in a tank disposed in a brine fluid circulating passage is controlled using a three-way proportional valve. Because the three-way proportional valve does not open and close in an abrupt ON/OFF fashion, but rather the degree of opening on the side for supplying chilled brine is gradually adjusted in proportion to a detection signal indicative of the brine temperature in the tank, a water hammer problem is avoided, and therefore a coolant circulating circuit including such a three-way proportional valve can be used effectively even with large capacity cooling units.

The above and other objects, features and advantages of the present invention will become apparent from the following description when taken in conjunction with the accompanying drawings in which a preferred embodiment of the present invention is shown by way of illustrative example.

DETAILED DESCRIPTION OF THE PREFERRED EMBODIMENTS

Figure 1:
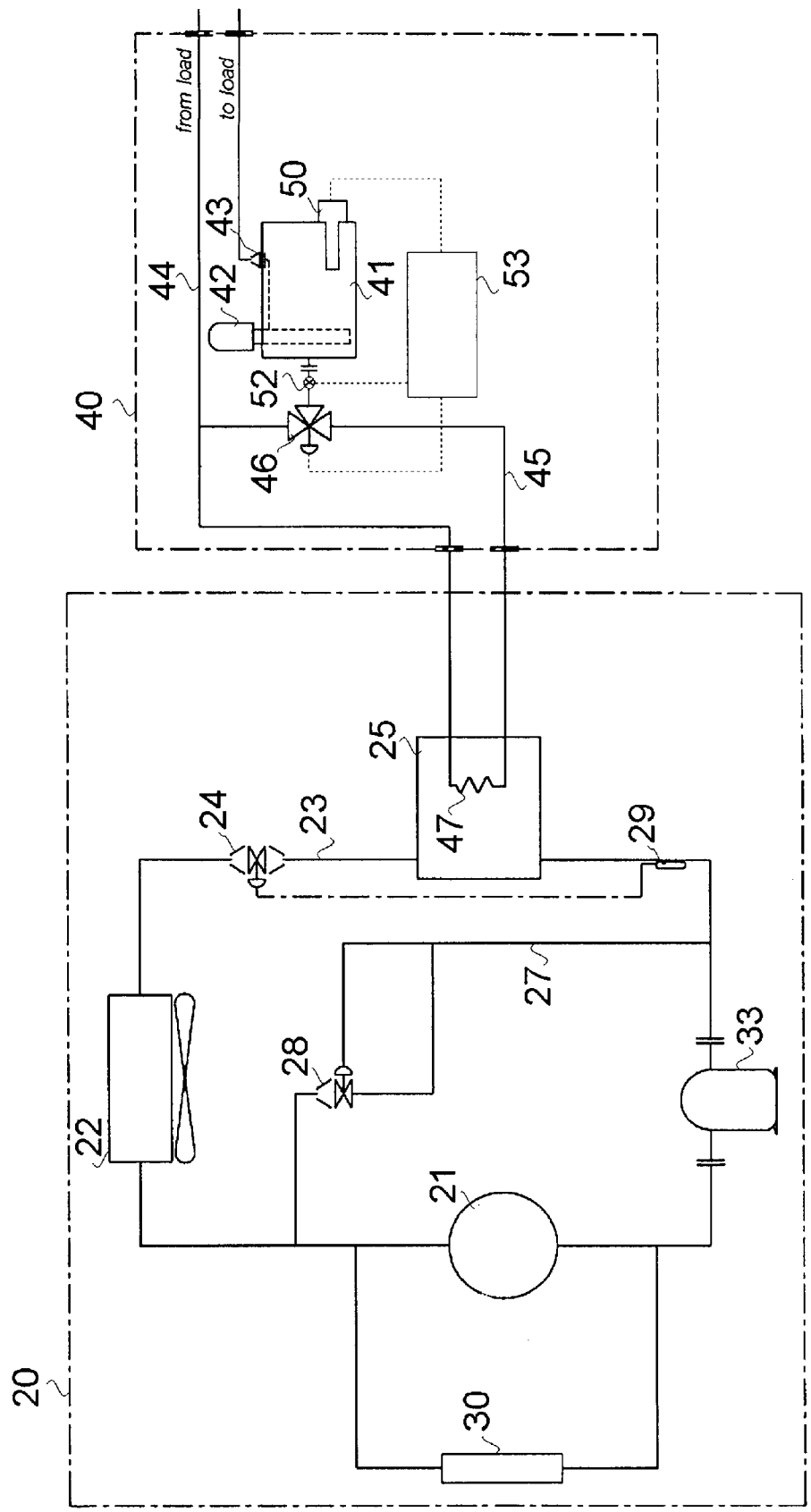
FIG. 1 is a system configuration of a cooling unit and brine coolant circulating circuit embodying the principles of the present invention.

FIG. 1 shows an embodiment of the present invention, in which the brine temperature control apparatus comprises a cooling unit 20 and a brine circulating circuit 40 respectively.

The above-noted cooling unit 20 is equipped with a compressor 21, a condenser 22, and a temperature-type expansion valve 24 disposed in series along a refrigerant medium circuit 23 including a heat exchanger 25. A hot gas bypass conduit 27 is provided into which a hot gas that is compressed by the compressor 21 can flow, bypassing the condenser 22 and expansion valve 24 when the compressor 21 is operating under low thermal load conditions or upon startup, as is well understood in the art. The degree of opening of the aforementioned temperature-type expansion valve 24 is controlled by a temperature sensing bulb 29. Driving of the compressor 21 is controlled by a high/low pressure switch 30, and the flow amount of hot gas flowing through the flow path 27 is controlled by a capacity adjusting valve 28, respectively. An oil separator 33 comprising a suction tank is also provided in a known manner.

The aforementioned brine circulating circuit 40 is equipped with a main flow path 44 in which a tank 41, a pump 42 and a load (not shown) are connected successively in series, and an auxiliary coolant flow path 45 which branches off from a return line from the load for recirculating the brine through the heat exchanger 25 and back to the tank 41. A three-way proportional valve 46 and a heat exchange portion 47 which undergoes heat exchange with the refrigerant of the cooling unit 20 in the heat exchanger 25 are disposed in series in the auxiliary coolant flow path 45. A level regulating valve 43 is also provided which controls the supply of brine to the load while keeping the level of brine in the tank 41 substantially constant.

The condenser 22 is illustrated in FIG. 1 as a fan cooled condenser unit, although it will be appreciated that the condenser 22 could also be cooled using cooling water supplied from an external cooling tower (not shown).

The three-way proportional valve 46 operates such that the amount of chilled brine which is introduced into the tank 41, after being chilled by circulating through the heat exchanger 25 in the auxiliary coolant flow path 45, can be varied proportionally to a temperature amount detected by the temperature sensor 52. The side of the three-way proportional valve 46 through which chilled brine is introduced can be operated over a range from being completely closed (0%), wherein freshly chilled brine is not introduced into the tank 41, to being completely open (100%), wherein substantially all of the brine returned from the load is circulated through the heat exchanger 25 and chilled therein before returning to the tank 41. Typically, under normal operating conditions, the average degree of opening of the three-way proportional valve 46 is about 60%.

The tank 41 has a heater 50 for applying heat to the brine, wherein a degree of opening of the three-way proportional valve 46, and supply and canceling of electricity to the heater 50, are controlled by a temperature controller 53 operated by a signal from a temperature sensor 52 that detects the temperature of the brine supplied to the tank 41. In the case that the temperature of the brine supplied to the tank 41 becomes higher than a preset temperature of the temperature controller 53, the three-way proportional valve 46 is opened for supplying chilled brine to a greater degree along with suspending the supply of electricity to the heater 50, whereby the brine is cooled. In the case that the supplied brine becomes lower than the preset temperature, the degree of opening of the three-way proportional valve 46 is lessened so that the amount of chilled brine introduced into the tank is decreased, along with supplying electricity to the heater 50, whereby the brine is heated. When the brine is determined to reside at the preset temperature, the degree of opening of three-way proportional valve 46 is not changed and the heater 50 is suspended, so that rise or fall of the brine temperature is halted.

Next, the operation of the above-described embodiment shall be discussed.

In the cooling unit 20, operation of the compressor 21 is regulated by a high/low pressure switch 30. Hot gas flows through the hot gas bypass conduit 27 for preventing freezing of the brine at a low temperature side of the heat exchanger 25 and is adjusted by a capacity adjusting valve 28. Further, control of an evaporation temperature of the heat exchanger 25 is performed by controlling a degree of opening of the temperature-type expansion valve 24 in accordance with a temperature sensing bulb 29.

On the other hand, brine which flows through a main flow passage 44 of the circulating circuit 40 receives heat or releases heat at the load (not shown) and recirculates to the tank 41, whereby the variable temperature of the brine supplied to the tank 41 is detected by the temperature sensor 52.

In the aforementioned temperature controller 53, as the temperature of brine supplied to the tank 41 and detected by the temperature sensor 52 increasingly rises inside of a preset temperature range set by the temperature controller 53, the degree of opening of the three-way proportional valve 46 for supplying chilled brine to the tank 41 is increased proportionally to the temperature rise. Thus, after the brine flowing through the auxiliary coolant flow path 45 is cooled in the heat exchange portion 47 of the heat exchanger 25, the chilled brine is circulated back to the tank 41, whereby the temperature of the brine inside the tank 41 falls in temperature to remain inside the preset temperature range. Conversely, as the temperature of the supplied brine decreases within the preset temperature range, the degree of opening of the three-way proportional valve 46 is decreased, while in addition, electricity is supplied to the heater 50, whereby the temperature of the brine inside the tank 41 rises to remain within the preset temperature range. When it is already at the preset temperature, the degree of opening of the three-way proportional valve 46 is not changed and supply of electricity to the heater 50 is halted, so that the rise or fall of temperature of the brine is stabilized.

Figure 2:
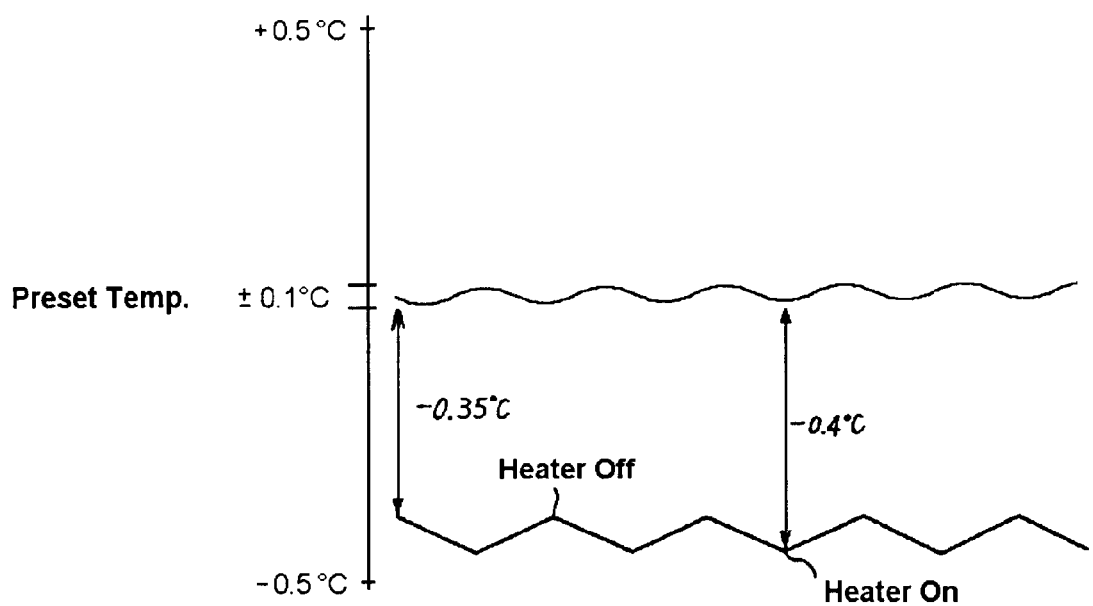
FIG. 2 shows operational results and effects of the temperature control apparatus using the embodiment shown in FIG. 1.
Figure 3:
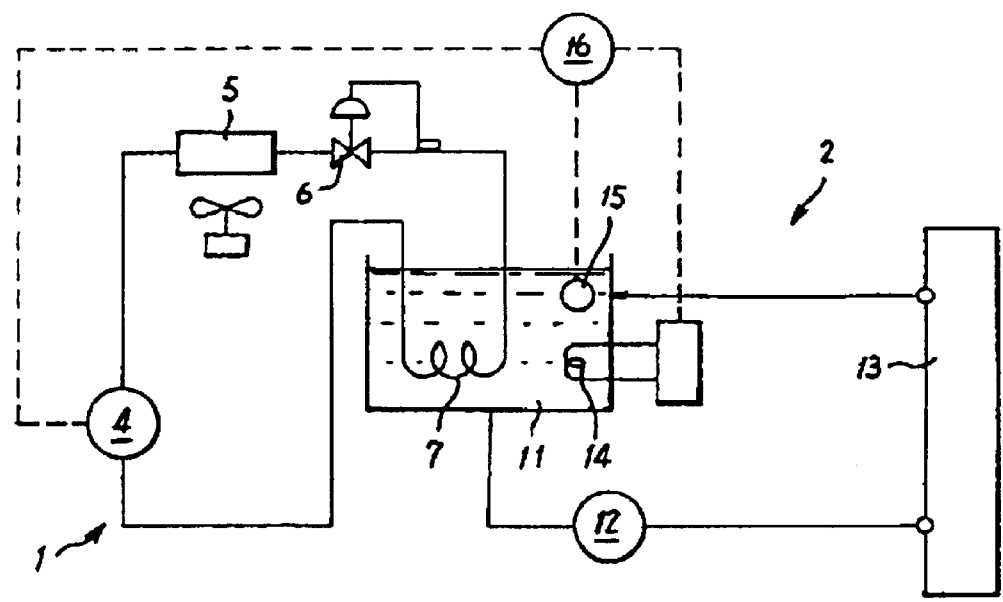
FIG. 3 is a system configuration of a cooling unit and brine coolant circulating circuit according to a conventional method.

FIG. 2 shows operational results and effects of the temperature control apparatus of the above-described embodiment. When the brine inside of tank 41 rises (i.e. progressively increases), the degree of opening of the three-way proportional valve 46 on the side for supplying chilled brine increases in proportion to the detected brine temperature, thereby cooling the brine. Conversely, the degree of opening of the three-way proportional valve 46 decreases as the detected brine temperature is lowered below the preset temperature, for reducing the supply of chilled brine and allowing the temperature of the brine in the tank 41 to increase.

More specifically, the wavy line in the upper half of FIG. 2 is intended to illustrate controlled brine temperature in a generalized case in which the temperature of the brine is relatively stable and fluctuating in a sinusoidal pattern at or around the preset temperature. Under normal operation, the average degree of opening of the three-way proportional valve 46 for supplying chilled brine into the tank 41 is about 60%. As the brine temperature increases, the degree of opening of the three-way proportional valve 46 also increases (indicated by rising portions of the wavy line), while conversely, as the brine temperature decreases, the degree of opening of the three-way proportional valve 46 decreases (indicated by a falling portions of the wavy line). It should be understood, however, that different and less regular fluctuations in temperature of the brine are not only possible but likely, in which case the pattern of opening and closing of the three-way proportional valve would not be sinusoidal.

Further, as shown in FIG. 2, if the temperature of the brine decreases to be about 0.4° C. below the preset temperature, electricity is supplied to the heater 50 to supply supplemental heating to the brine to elevate its temperature to the range in which the three-way proportional valve is operating on its own. When the brine temperature reaches about 0.35° C. below the preset temperature, the supply of electricity is halted, although the temperature of the brine will continue to rise for a time after the heater is cut off. It should further be noted that when the heater is operating the three-way proportional valve can be completely closed to enable the brine temperature to recover to the preset temperature more quickly.

Figure 4:
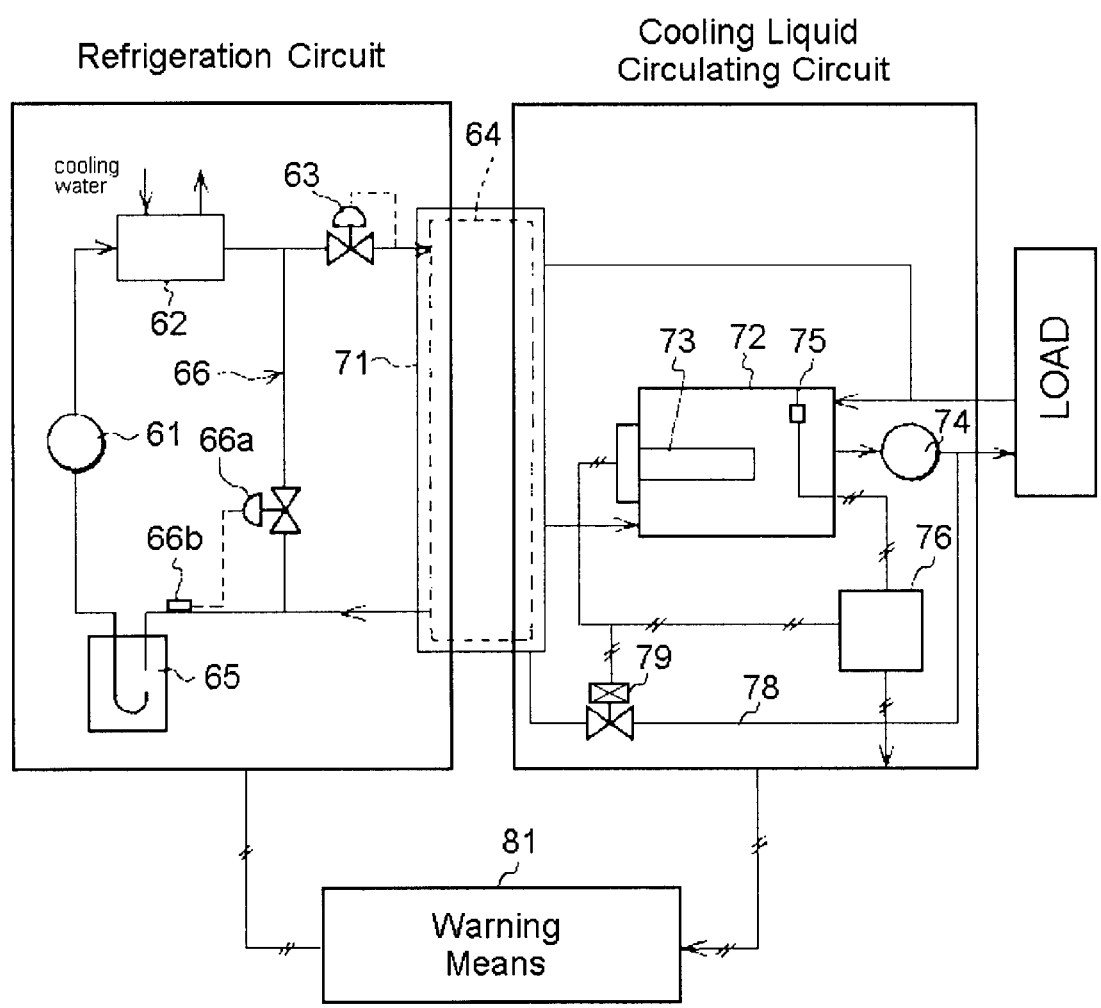
FIG. 4 is a block diagram of another conventional constant temperature liquid circulating apparatus.
Figure 5:
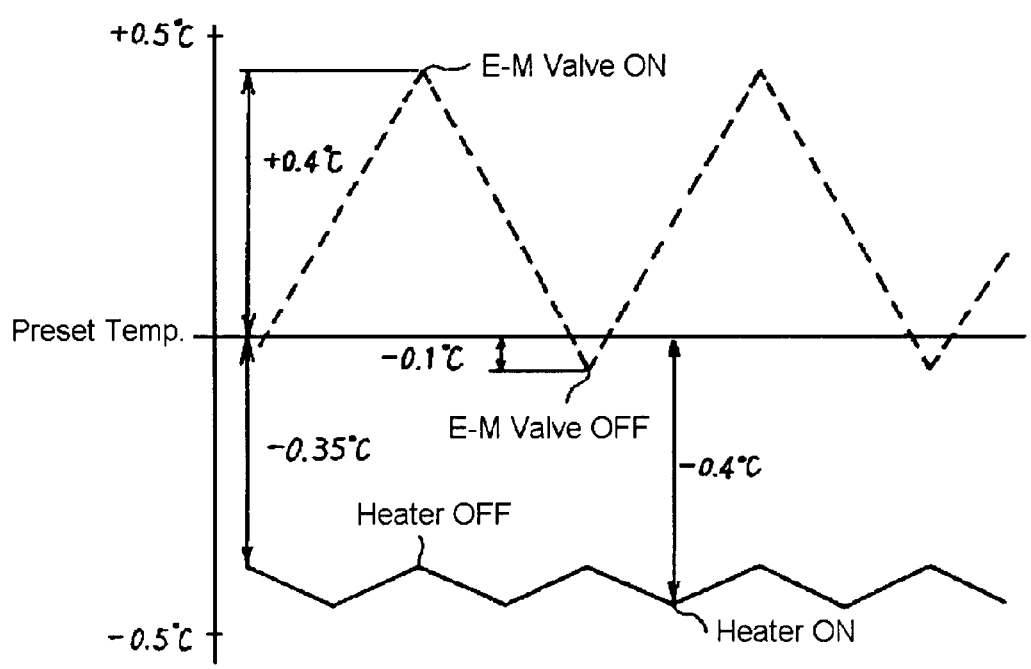
FIG. 5 illustrates operation of the apparatus shown in FIG. 4.

As a result, the temperature of brine inside the tank 41 can be controlled with high precision within a narrow range of about ±0.1° C. around the preset temperature. By contrast, as understood from FIG. 5, a precision of ±0.4° C. exists in apparatus of the conventional device shown in FIG. 4. Therefore, an improvement in precision of the present invention should also be readily apparent.

Furthermore, in the above embodiment, based on a temperature difference between the temperature of the brine in the tank 41 and the preset temperature of the temperature controller 53, cooling or heating of the brine is selectively performed, and there is no need for both cooling and heating of the brine based on separate operating conditions, so that compared to the former apparatus in which heat was applied to brine which had been chilled more than necessary to cause the brine to rise back to a fixed preset temperature, in the present invention consumption of energy can be dramatically reduced.

Further, in the case that the surrounding ambient temperature of the cooling unit changes inside of a ±0.4° C. temperature range, for example, if the brine preset temperature is set at 20° C., when the ambient temperature is 20° C. or below, the brine begins to release heat and therefore is controlled by the heater. When the ambient temperature is 20° C. or above, the brine begins to absorb heat, and therefore by controlling the temperature thereof by the three-way proportional valve 46, a change of ambient temperature over a wide range can be dealt with, and as a result, the cooling unit 21 can be driven continuously.

Moreover, an ON/OFF type electromagnetic valve is not used, but rather the three-way proportional valve 46 is used which opens and closes gradually about an average degree of opening in accordance with a detected temperature of brine supplied to the tank 41. Therefore, a water hammer effect is not caused, and the apparatus operates smoothly and quietly even in the case of large scale high capacity chiller units.

It shall be understood that other modifications will be apparent and can be easily made by persons skilled in the art without departing from the scope and spirit of the present invention. Accordingly, the following claims shall not be limited by the descriptions or illustrations set forth herein, but shall be construed to cover with reasonable breadth all features which may be envisioned as equivalents by persons skilled in the art.

What is claimed is:

1. A brine temperature controlling apparatus, comprising:
   a refrigeration unit having a compressor, a condenser, an expansion valve and a heat exchanger connected successively in series;
   a main brine circulating circuit having a tank, a pump and a load connected successively in series;
   a heater disposed in said tank;
   means for supplying electricity to activate said heater when the brine temperature falls below a preset temperature;
   an auxiliary brine circulating coolant passage, which passes through a proportional valve and said heat exchanger, providing fluid transport of cooled brine in a recirculating manner to said tank; and
   a temperature control means for controlling a degree of opening of said proportional valve such that the degree of opening of said proportional valve increases for supplying more cooled brine into said tank as the temperature of the brine in said tank increases, and the degree of opening of said proportional valve decreases for supplying less cooled brine into said tank as the temperature of the brine in said tank decreases.

2. A brine temperature controlling apparatus according to claim 1, wherein said proportional valve is a three-way proportional valve.

3. A brine temperature controlling apparatus according to claim 1, further comprising a temperature sensor, disposed in said main brine circulating path between said proportional valve and said tank, for sensing the temperature of said brine supplied to said tank, and providing a signal indicative of said temperature of said brine to said temperature control means.

* * * * *